(12) United States Patent
Liu et al.

(10) Patent No.: US 8,302,505 B2
(45) Date of Patent: Nov. 6, 2012

(54) SENSING MECHANISM OF PEDALING ASSISTANT SYSTEM

(76) Inventors: Kuang-Hsiung Liu, Shengang Township, Taichung County (TW); Chin Lee Liao, Zhudong Township, Hsinchu County (TW)

( * ) Notice: Subject to any disclaimer, the term of this patent is extended or adjusted under 35 U.S.C. 154(b) by 423 days.

(21) Appl. No.: 12/685,955

(22) Filed: Jan. 12, 2010

(65) Prior Publication Data

US 2010/0180718 A1     Jul. 22, 2010

(30) Foreign Application Priority Data

Jan. 21, 2009   (TW) ............................... 98201181 U

(51) Int. Cl.
*B62M 3/00* (2006.01)
(52) U.S. Cl. ..................................................... 74/594.1
(58) Field of Classification Search ............... 74/560, 74/594.1, 594.2, 594.3, 594.7; 280/249, 280/259, 260; 301/2.5
See application file for complete search history.

(56) References Cited

U.S. PATENT DOCUMENTS

| | | | | |
|---|---|---|---|---|
| 5,984,335 A * | 11/1999 | Tseng | ........................... | 280/253 |
| 6,340,067 B1 * | 1/2002 | Fujiwara et al. | ........... | 180/206.8 |
| 6,874,592 B2 * | 4/2005 | Yokotani et al. | ........... | 180/206.2 |
| 2005/0199092 A1 * | 9/2005 | Feltrin et al. | .................. | 74/594.1 |
| 2006/0033305 A1 * | 2/2006 | Crozet | ........................... | 280/259 |

FOREIGN PATENT DOCUMENTS

TW           096213821           2/2008

* cited by examiner

*Primary Examiner* — Vicky Johnson
(74) *Attorney, Agent, or Firm* — Guice Patents PLLC

(57) ABSTRACT

A sensing mechanism of pedaling assistant system, including a crank and a sensing element. The crank includes an elongated first crank member and an elongated second crank member connected therewith. A first axial end of the first crank member is connected with a pedal component of a bicycle. A first axial end of the second crank member is connected with an axle of the bicycle. An end face of a second axial end of the second crank member abuts against an end face of a second axial end of the first crank member. The sensing element is disposed between the second axial end of the first crank member and the second axial end of the second crank member for detecting a force transmitted from the pedal component through the first crank member to the second crank member.

10 Claims, 5 Drawing Sheets

US 8,302,505 B2

SENSING MECHANISM OF PEDALING ASSISTANT SYSTEM

BACKGROUND OF THE INVENTION

The present invention relates generally to a transportation means, and more particularly to a sensing mechanism of pedaling assistant system.

In modern society, a bicycle has become a transportation means or a sort of sport equipment. A rider can ride a bicycle solely for the purpose of exercise. The bicycle can be equipped with a pedaling assistant system for providing assistant power to aid the rider when riding uphill. Accordingly, by means of the pedaling assistant system, the rider can save some strength and ride the bicycle without applying an excessively great force to the pedals in an uphill ride. In this case, the rider is protected from possible sport injury caused by overexertion. Taiwanese Patent No. 096213812 discloses a pedaling force detection system of a power-assisted bicycle. The detection system includes a pedaling force sensor set arranged on the pedal of the bicycle in direct contact with a rider's foot. When the rider applies a pedaling force onto the pedal, the sensor set detects the pedaling force and transmits a control signal to drive a motor for providing assistant power to aid the rider in riding the bicycle and relieve the rider from the load.

However, such pedaling force detection system has some defects. First, the pedaling force sensor set is arranged on the pedal of the bicycle and exposed to ambient environment. Therefore, the pedaling force sensor set is apt to be collided due to negligence. Second, the rider's foot directly pedals on the pedal so that the pedaling force sensor set is subject to damage.

SUMMARY OF THE INVENTION

It is therefore a primary object of the present invention to provide a sensing mechanism of pedaling assistant system, in which the sensing element is not exposed to ambient environment and prevented from being incautiously collided or directly pedaled. Therefore, the sensing element is protected from being damaged due to improper external force.

To achieve the above and other objects, the sensing mechanism of pedaling assistant system of the present invention includes a crank and a sensing element. The crank includes an elongated first crank member and an elongated second crank member connected therewith. A first axial end of the first crank member is connected with a pedal component of a bicycle. A first axial end of the second crank member is connected with an axle of the bicycle. An end face of a second axial end of the second crank member abuts against an end face of a second axial end of the first crank member. The sensing element is disposed between the second axial end of the first crank member and the second axial end of the second crank member for detecting a force transmitted from the pedal component through the first crank member to the second crank member.

The present invention can be best understood through the following description and accompanying drawings, wherein:

DETAILED DESCRIPTION OF THE PREFERRED EMBODIMENTS

Figure 1:
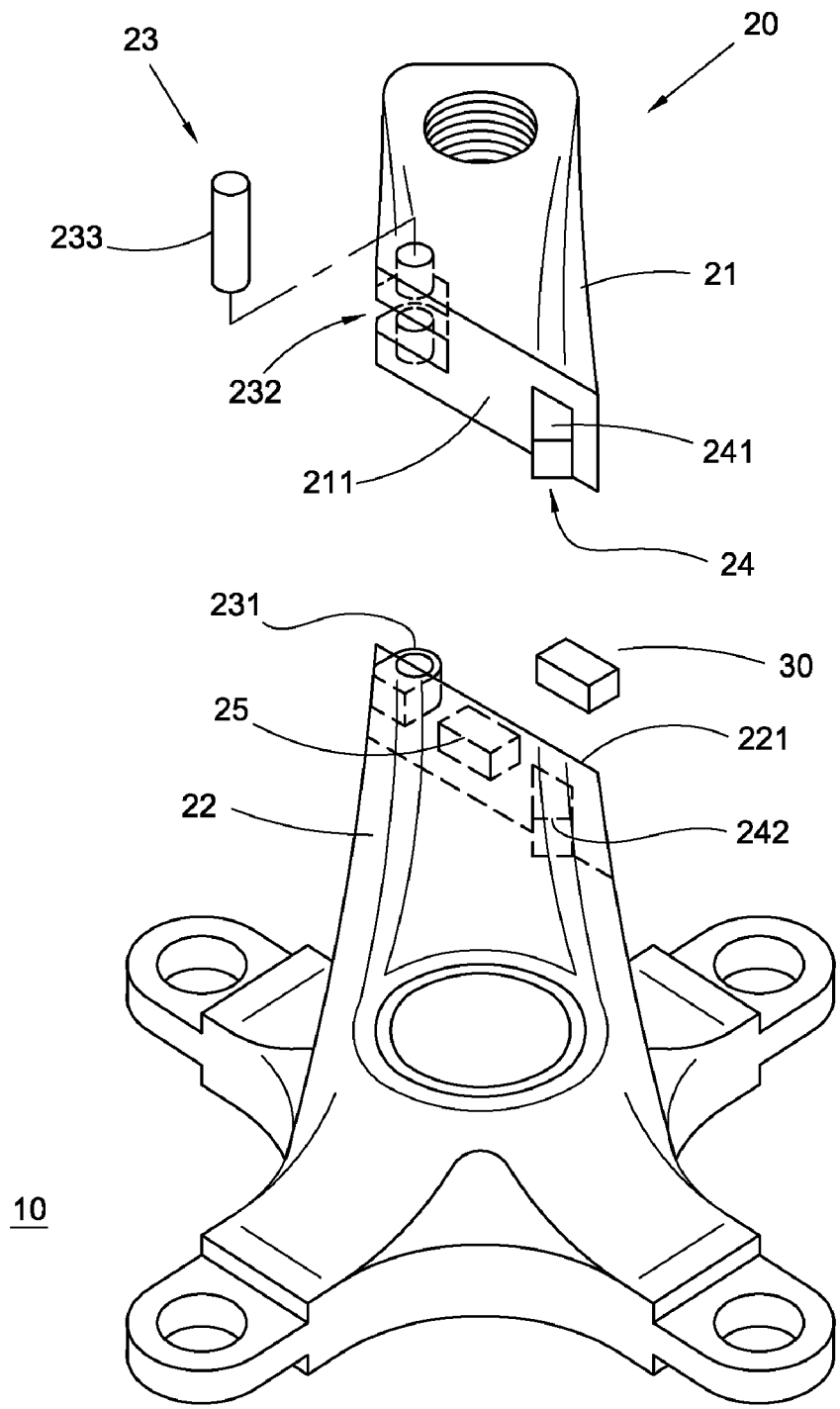
FIG. 1 is a perspective exploded view of a first embodiment of the present invention.
Figure 2:
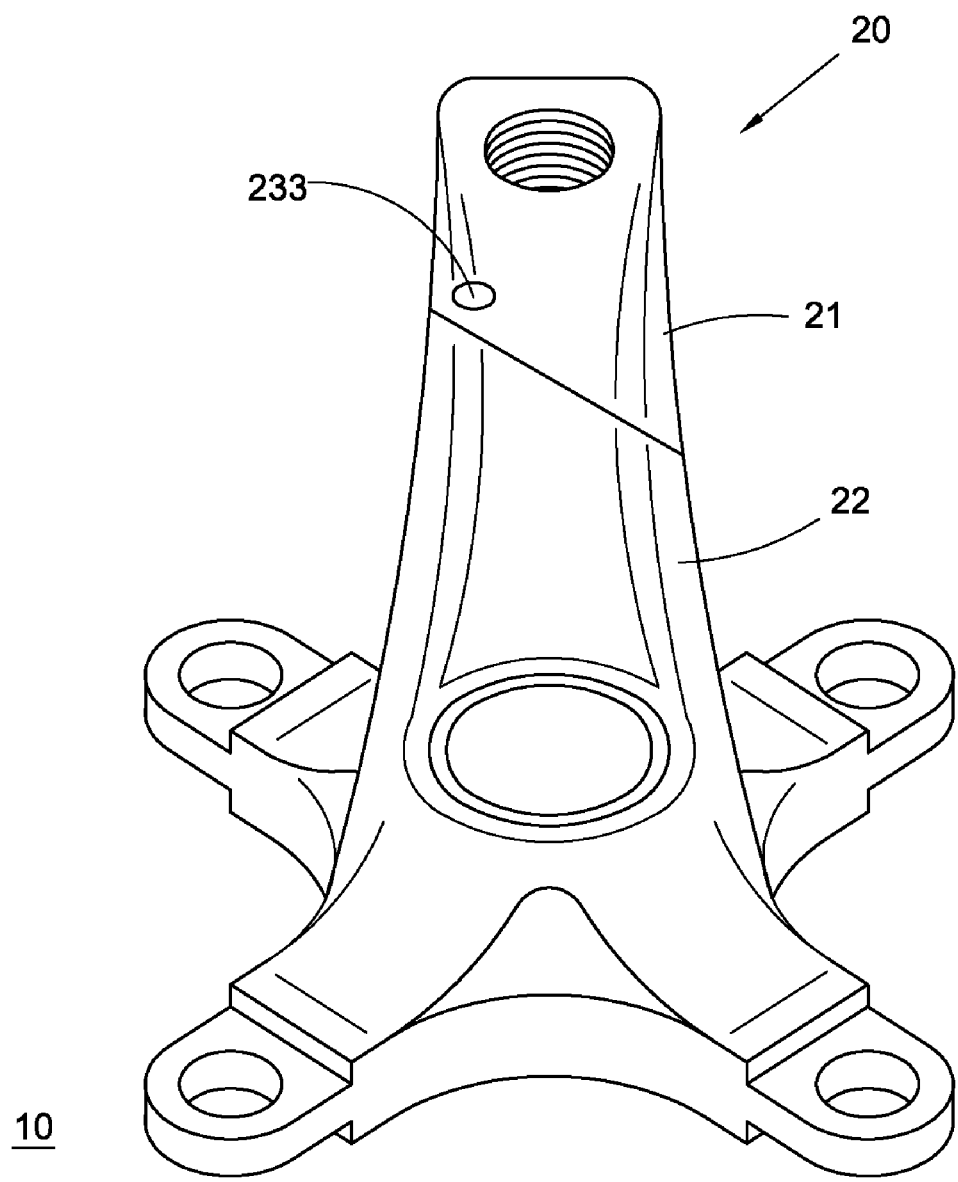
FIG. 2 is a perspective assembled view of the first embodiment of the present invention.
Figure 3:
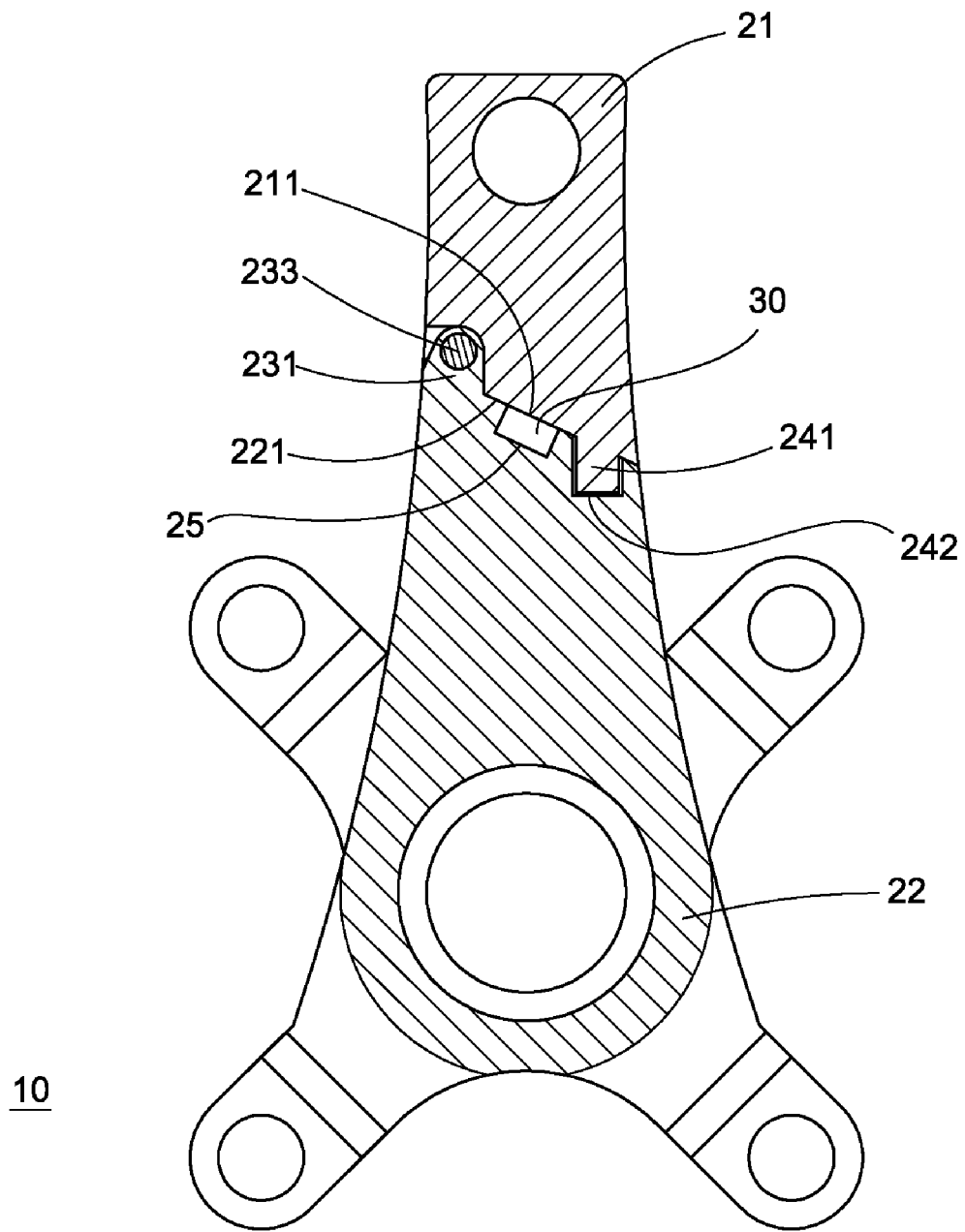
FIG. 3 is a sectional view taken along line 3-3 of FIG. 2.

Please refer to FIGS. 1 to 3. According to a first embodiment, the sensing mechanism 10 of the pedaling assistant system of the present invention includes a crank 20 and a sensing element 30.

The crank 20 is a component of a bicycle for connecting the pedal with the B.B. part or chainwheel set. To speak more specifically, the crank 20 includes an elongated first crank member 21 and an elongated second crank member 22 coaxially connected therewith. A first axial end of the first crank member 21 is connected with a pedal component. A first axial end of the second crank member 22 is connected with the B.B. part or chainwheel set of the bicycle. An end face of a second axial end of the second crank member 22 abuts against an end face 211 of a second axial end of the first crank member 21. A pivot section 23 is disposed between the second axial end of the first crank member 21 and the second axial end of the second crank member 22, whereby the first and second crank members 21, 22 can be pivotally rotated about the pivot section 23 relative to each other. A rotation restricting section 24 is disposed between the second axial end of the first crank member 21 and the second axial end of the second crank member 22 and spaced from the pivot section 23. The rotation restricting section 24 serves to limit the rotational angle of the first and second crank members 21, 22. The end face of the second axial end of the second crank member 22 is recessed to form a cavity 25 for accommodating the sensing element 30.

The pivot section 23 includes a ring-shaped pivot lug 231 disposed on one side of the end face 221 of the second axial end of the second crank member and protruding therefrom. A pivot notch 232 is formed on one side of the end face 211 of the second axial end of the first crank member corresponding to the pivot lug 231. The pivot lug 231 can be inserted in the pivot notch 232. A middle section of a pivot shaft 233 is coaxially pivotally fitted in the pivot lug 231. Two ends of the pivot shafts 233 are embedded in two sidewalls of the pivot notch 232. Accordingly, the first and second crank members 21, 22 can be pivotally rotated about the pivot shaft 233 relative to each other.

The rotation restricting section 24 has an insertion key 241 outward extending from the other side of the end face 211 of the second axial end of the first crank member along a length thereof by a certain length. An insertion hole 242 as a blind hole is formed on the other side of the end face 221 of the second axial end of the second crank member corresponding to the insertion key 241. The insertion hole 242 has an axis parallel to a length of the second crank member 22. The insertion key 241 can be inserted in the insertion hole 242. The insertion hole 242 has a diameter slight larger than that of the insertion key, whereby the rotational angle of the first and second crank members 21, 22 is limited within a certain range.

The sensing element 30 is a conventional force-sensing unit accommodated in the cavity 25. The sensing element 30 serves to detect the magnitude of the force transmitted from the end face 211 of the first crank member to the end face 221 of the second crank member and transmit the detected data to outer side in the form of wired or wireless signal.

According to the above arrangement, when a rider rides the bicycle and pedals the pedal component, the pedaling force is transmitted to the chainwheel set via the crank 20 for driving the bicycle. At this time, the pedaling force applied to the pedal component is transmitted from the first crank member 21 to the second crank member 22 via the end faces 211, 221 that abut against each other. Accordingly, the sensing element 30 disposed between the end faces 211, 221 can precisely detect the magnitude of the transmitted force. Therefore, the sensing mechanism 10 of the pedaling assistant system can reflect the actual pedaling force in bicycle riding as the basis for the judgment of whether the pedaling assistant system should provide assistant power.

It should noted that the present invention is characterized in that the sensing mechanism 10 of the pedaling assistant system is positioned in the crank 20 for detecting the pedaling force of a rider. The crank 20 is composed of the first crank member 21 and the second crank member 22, which are detachably mated with each other. According to such arrangement, the sensing element 30 can detect the pedaling force at higher precision. Moreover, the sensing element 30 of the sensing mechanism 10 is embedded in the crank 20 and protected from being directly pedaled by a rider's foot.

Figure 4:
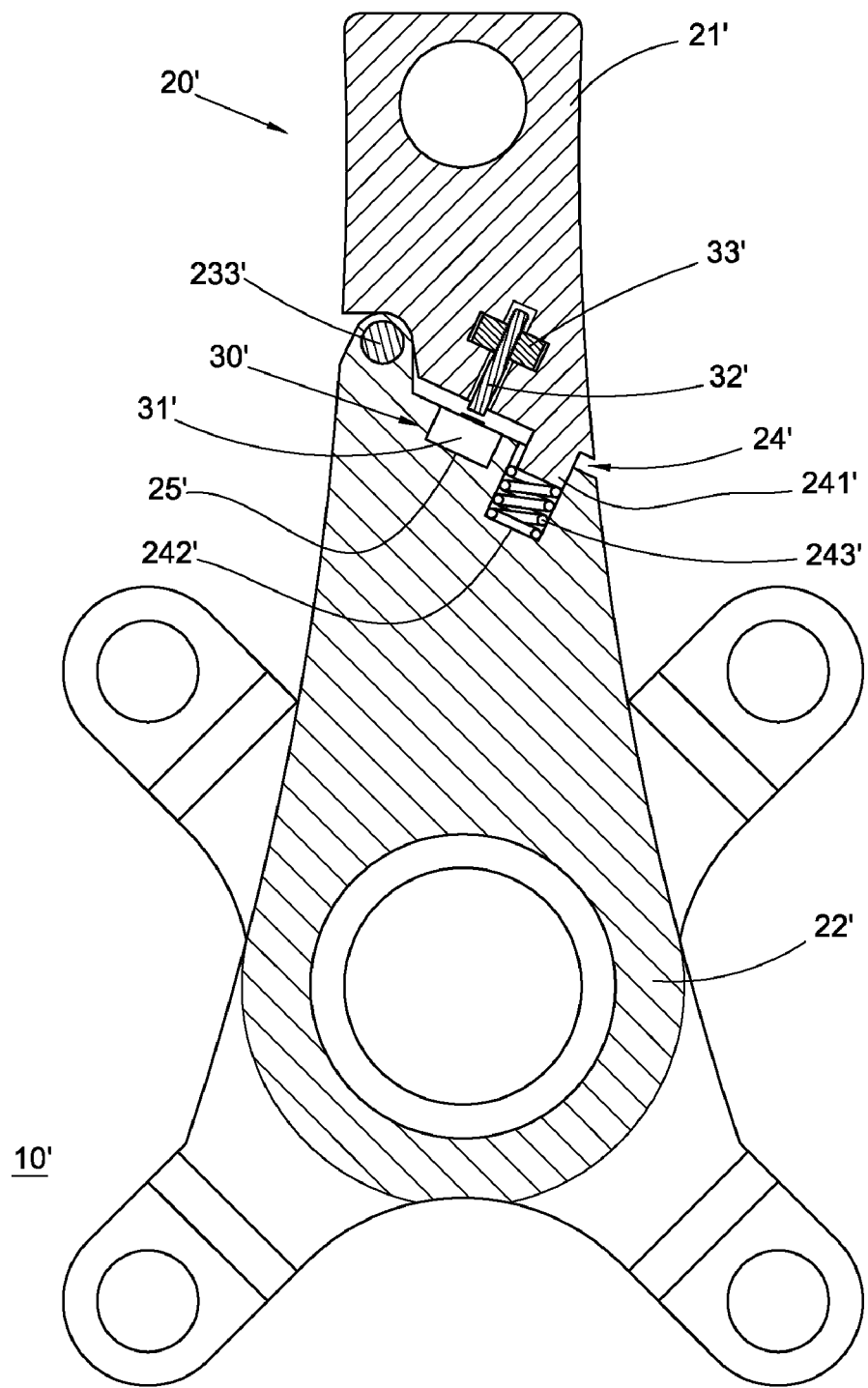
FIG. 4 is a sectional view of a second embodiment of the present invention, in which the crank is free from any force.
Figure 5:
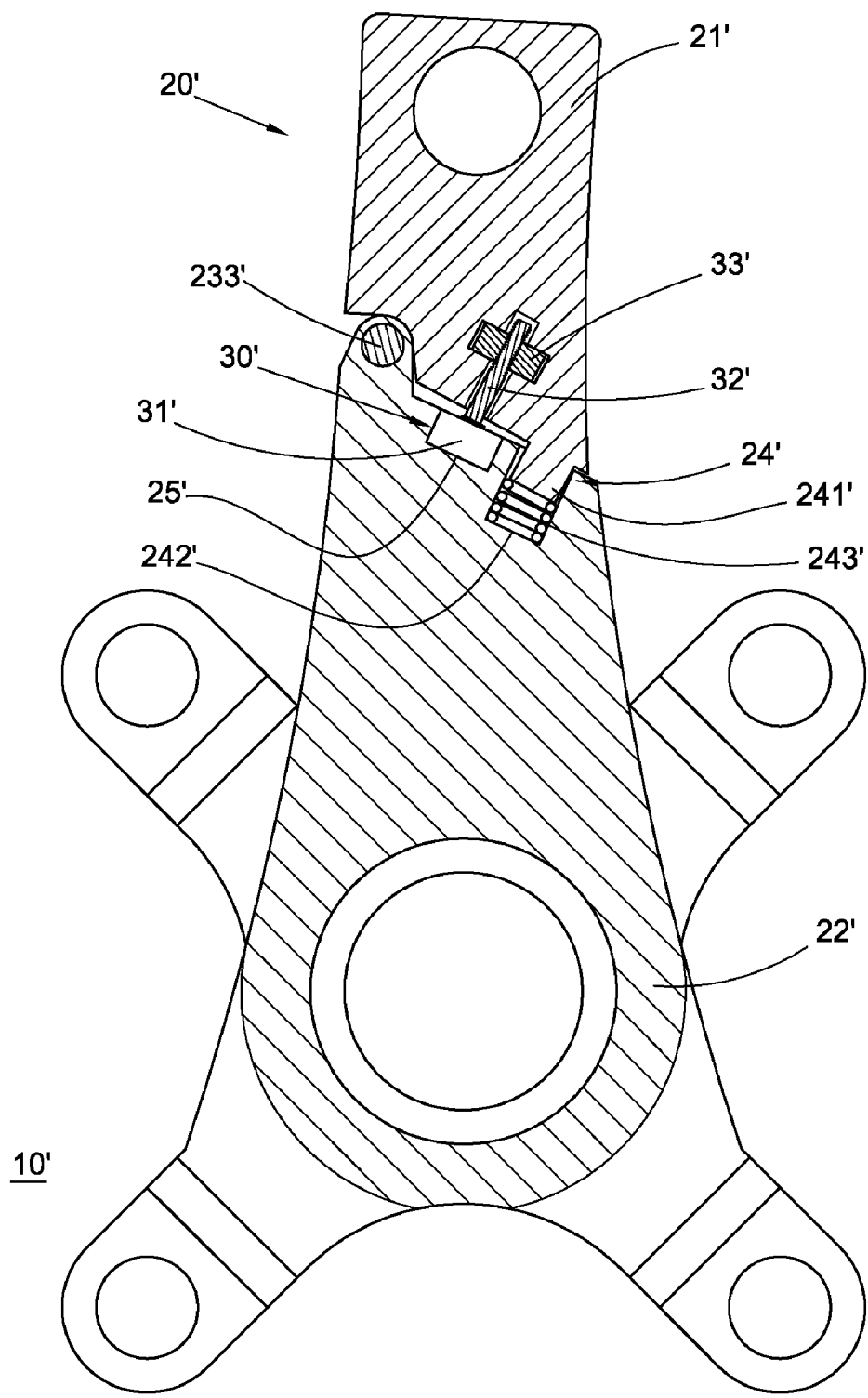
FIG. 5 is a sectional view of the second embodiment of the present invention, in which a force is applied to the crank.

Please refer to FIGS. 4 and 5, which show a second embodiment of the sensing mechanism 10' of the pedaling assistant system of the present invention. The second embodiment is substantially identical to the first embodiment. The second embodiment is different from the first embodiment only in the sensing element 30'.

To speak more specifically, the sensing element 30' of the second embodiment has a push switch 31' embedded in the cavity 25'. A pushrod 32' is embedded in the first crank member 21' with a first end facing the push switch 31'. An adjustment threaded bush 33' is embedded in the first crank member 21' and screwed on the thread formed on a second end of the pushrod 32'. By means of the adjustment threaded bush 33', the length of the section of the pushrod 32' that protrudes out of the first crank member 21' can be adjusted.

In addition, the rotation restricting section 24' has a spring 243' not disclosed in the first embodiment. The spring 243' is positioned between a free end of the insertion key 241' and a wall of the insertion hole 242'. The spring 243' serves to apply a resilient force to the insertion key 241' to make the first crank member 21' move away from the second crank member 22'. Accordingly, in the case that the crank 20' is free from any pedaling force, the free end of the pushrod 32' is spaced from the push switch 31' as shown in FIG. 4.

According to the above arrangement, when a rider pedals on the pedal of the bicycle to apply a force onto the crank 20' as shown in FIG. 5, the first crank member 21' is pivotally rotated about the pivot shaft 233' toward the second crank member 22'. At this time, the pushrod 32' presses and switches on the push switch 31', enabling the sensing element 30' to generate and transmit the signal. The pedaling assistant system serves to receive the signal as the basis for the judgment of whether the pedaling assistant system should provide assistant power. In comparison with the first embodiment, the second embodiment can achieve the same effect at lower cost. Moreover, by means of adjusting the length of the protruding section of the pushrod 32', the pedaling force necessary for generation of the signal can be controlled in accordance with different requirements of different users.

The above embodiments are only used to illustrate the present invention, not intended to limit the scope thereof. Many modifications of the above embodiments can be made without departing from the spirit of the present invention. For example, the first and second crank members can be alternatively slidably connected rather than pivotally connected.

What is claimed is:

1. A sensing mechanism of pedaling assistant system, comprising:
    a crank including an elongated first crank member and an elongated second crank member connected therewith, a first axial end of the first crank member being connected with a pedal component of a bicycle, a first axial end of the second crank member being connected with an axle of the bicycle, an end face of a second axial end of the second crank member abutting against an end face of a second axial end of the first crank member; and
    a sensing element disposed between the second axial end of the first crank member and the second axial end of the second crank member for detecting a force transmitted from the pedal component through the first crank member to the second crank member;
    wherein the crank further includes a pivot section disposed between the second axial end of the first crank member and the second axial end of the second crank member for pivotally connecting the first and second crank members with each other.

2. The sensing mechanism of pedaling assistant system as claimed in claim 1, wherein the first crank member and the second crank member are coaxially connected with each other.

3. The sensing mechanism of pedaling assistant system as claimed in claim 1, wherein the crank further includes a rotation restricting section disposed between the second axial end of the first crank member and the second axial end of the second crank member for limiting rotational angle of the first and second crank members.

4. The sensing mechanism of pedaling assistant system as claimed in claim 3, wherein the rotation restricting section has an insertion key outward extending from the end face of the second axial end of the first crank member in a direction parallel to a length of the first crank member, the rotation restricting section further having an insertion hole formed on the end face of the second axial end of the second crank member, whereby the insertion key can be coaxially inserted in the insertion hole.

5. The sensing mechanism of pedaling assistant system as claimed in claim 4, wherein the insertion hole has a diameter larger than that of the insertion key.

6. The sensing mechanism of pedaling assistant system as claimed in claim 4, wherein the rotation restricting section further has a spring positioned between a free end of the insertion key and a wall of the insertion hole.

7. The sensing mechanism of pedaling assistant system as claimed in claim 1, wherein the pivot section includes a ring-shaped pivot lug disposed on one side of the end face of the second axial end of the second crank member and protruding therefrom, the pivot section further including a pivot notch formed on one side of the end face of the second axial end of the first crank member, whereby the pivot lug can be inserted in the pivot notch, the pivot section further including a pivot shaft having an axis normal to a length of the second crank member, the pivot shaft being coaxially pivotally fitted in the pivot lug, two ends of the pivot shafts being embedded in two sidewalls of the pivot notch.

8. A sensing mechanism of pedaling assistant system, comprising:
    a crank including an elongated first crank member and an elongated second crank member connected therewith, a first axial end of the first crank member being connected with a pedal component of a bicycle, a first axial end of the second crank member being connected with an axle of the bicycle, an end face of a second axial end of the second crank member abutting against an end face of a second axial end of the first crank member; and a sensing element disposed between the second axial end of the first crank member and the second axial end of the second crank member for detecting a force transmitted from the pedal component through the first crank member to the second crank member;

wherein the end face of the second axial end of the second crank member is recessed to form a cavity for accommodating the sensing element.

9. The sensing mechanism of pedaling assistant system as claimed in claim 8, wherein the sensing element includes a push switch received in the cavity and a pushrod embedded in the first crank member, a first end of the pushrod protruding from the end face of the second axial end of the first crank member toward the push switch.

10. The sensing mechanism of pedaling assistant system as claimed in claim 9, wherein the sensing element further includes an adjustment threaded bush located and embedded in the first crank member and screwed on a second end of the pushrod, whereby by means of the adjustment threaded bush, the length of a section of the pushrod that protrudes from the end face of the second axial end of the first crank member can be adjusted.

* * * * *